United States Patent
Mathews

(10) Patent No.: US 12,473,202 B1
(45) Date of Patent: Nov. 18, 2025

(54) TWO-STEP METHOD TO PRODUCE MONOCALCIUM PHOSPHATES FROM LIME SOFTENING WATER PLANT RESIDUALS

(71) Applicant: Alexander P Mathews, Manhattan, KS (US)

(72) Inventor: Alexander P Mathews, Manhattan, KS (US)

( * ) Notice: Subject to any disclaimer, the term of this patent is extended or adjusted under 35 U.S.C. 154(b) by 0 days.

(21) Appl. No.: 19/080,857

(22) Filed: Mar. 15, 2025

(51) Int. Cl.
  *C05B 17/00*  (2006.01)
  *C01B 25/32*  (2006.01)
  *C01B 32/50*  (2017.01)
  *C05B 3/00*   (2006.01)

(52) U.S. Cl.
  CPC ............ *C01B 25/321* (2013.01); *C01B 32/50* (2017.08); *C05B 3/00* (2013.01); *C05B 17/00* (2013.01)

(58) Field of Classification Search
  CPC ....... C01B 25/321; C01B 32/50; C05B 17/00; C05B 3/00
  USPC ........................................................ 210/687
  See application file for complete search history.

(56) References Cited

U.S. PATENT DOCUMENTS

| | | | | |
|---|---|---|---|---|
| 1,910,617 | A | * | 5/1933 | Leu ............................ C05B 1/04 71/44 |
| 2,985,527 | A | * | 5/1961 | Nossen .................... C05B 11/06 71/39 |
| 3,650,686 | A | * | 3/1972 | Hudson .................. C02F 1/5236 210/906 |
| 2002/0022756 | A1 | * | 2/2002 | Chowdhury .............. B09C 1/08 588/407 |

FOREIGN PATENT DOCUMENTS

IT     1141656 B  * 10/1986
RU  2646060 C1  *  3/2018  ............... C05B 1/04

* cited by examiner

*Primary Examiner* — Wayne A Langel

(57) ABSTRACT

This disclosure provides a two-step process to produce monocalcium phosphates from lime water treatment plant lime softening residuals and from other sources containing calcium salts. This patent focuses on the reuse of lime softening residuals to produce monocalcium phosphates and dicalcium phosphates for use in a variety of applications including as quick release and slow release fertilizers, for animal feed and other applications. The two-step process is conducted close to ambient temperatures and under controlled pH conditions to produce substantially pure calcium phosphate products while at the same time capturing the carbon dioxide generated in the process.

17 Claims, 1 Drawing Sheet

Process flowsheet

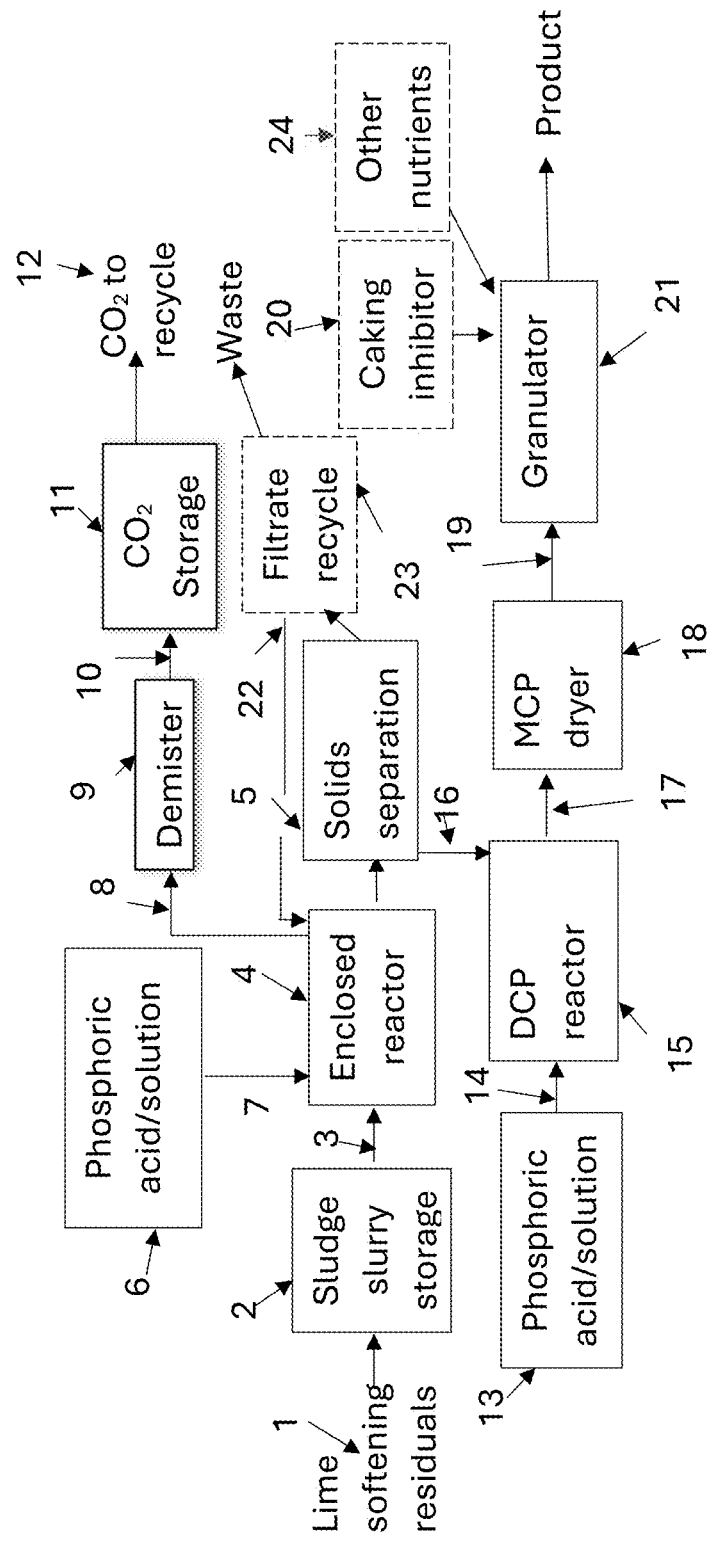

TWO-STEP METHOD TO PRODUCE MONOCALCIUM PHOSPHATES FROM LIME SOFTENING WATER PLANT RESIDUALS

BACKGROUND OF THE INVENTION

Field of the Invention

This invention is broadly concerned with a process for the production of calcium phosphates by making use of the calcium compounds present in residuals from chemical softening of water supplies. The residuals can be used as available in slurry form or dewatered to a higher concentration and reacted with phosphoric acid in a closed reactor to yield calcium phosphate salts along with carbon dioxide, a reaction byproduct. This invention will provide a method to optimize the production of calcium phosphates, and the capture of carbon dioxide for reuse as desired. The calcium phosphates produced include monocalcium phosphate in its anhydrous or monohydrate form and dicalcium phosphate in its anhydrous or dihydrate form for use as fertilizers, animal feed products, food additives, or as nutritional supplements. Other sources or raw materials containing calcium carbonate including eggshells, seashells, limestone, and other materials can be processed in the same manner to obtain the desired phosphate products. Other sources containing calcium ions such as calcium chloride, calcium nitrate and other similar salts of calcium can also be reacted with phosphoric acid according to this procedure to produce monocalcium and dicalcium phosphates.

Description of the Prior Art

This patent application is mainly concerned with the production of monocalcium phosphates and dicalcium phosphates in their anhydrous or hydrated forms by reacting lime softening water plant residuals with phosphoric acid or sources of phosphoric acid such as phosphate rock. The term monocalcium phosphate (MCP) will be used to refer to both the anhydrous and hydrous forms. MCPA will be used to specifically refer to the anhydrous form, and MCPM will be used to refer to monocalcium phosphate monohydrate. The term dicalcium phosphate (DCP) will be used to refer to both the anhydrous and anhydrous form. DCPA will be used to refer specifically to dicalcium phosphate anhydrous, and DCPD will be used to refer specifically to dicalcium phosphate dihydrate.

MCP is mainly used as a food additive, as a supplement in animal feed, in dental products such as toothpaste and mouthwash, and as a plant fertilizer. It is the major component of single superphosphate (SSP) fertilizer and triple superphosphate (TSP) fertilizer. MCP is produced by reacting phosphate rock with sulfuric acid or phosphoric acid in a one-step reaction. The product of reaction of phosphate rock with sulfuric acid will contain MCP and calcium sulfate and other impurities in addition to MCP. This product is known as SSP and is used as an agricultural fertilizer. The product of one-step reaction of phosphate rock with phosphoric acid will contain MCP plus impurities present in phosphate rock. U.S. Pat. No. 2,018,449 teaches a method to produce MCP by reacting dry lime with phosphoric acid at a temperature of 85° C. to 100° C. and under vacuum. The product obtained is not pure and contains about 1% phosphoric acid and 8% to 10% of dicalcium phosphate. U.S. Pat. No. 2,121,208 discloses a method to react lime with a strong solution of phosphoric acid at a temperature of 90° C. to 95° C. and crystallizing substantially pure MCP from the phosphoric acid solution. U.S. Pat. No. 3,401,014 discloses a method to produce pure monocalcium phosphate by reacting impure phosphoric acid and phosphate rock or lime at an elevated temperature of up to 200° F. All of the above patents require high temperatures for reaction ranging from 90° C. to 95° C. None of the above processes use water plant residuals as a source of calcium for the reaction with phosphoric acid to produce MCP and DCP.

Water treatment plant residuals from lime softening operations contain calcium carbonate with other organic and inorganic impurities. Water softening is conducted by adding chemicals calcium hydroxide and sodium carbonate, to precipitate out calcium carbonate and magnesium hydroxide so as to reduce the hardness of water. The solid product also known as lime softening residuals or lime softening sludge is separated and disposed of before or after dewatering to remove water from the residuals. The amount of lime-softening sludge produced can range from 0.64 to 1.58 tons of dry solids per million gallons (MG) of water processed.

There have been studies conducted to find uses for lime softening sludge, for example, in cement production, dust control on roads, for $SO_x$ treatment in power plants, and as in-fill materials for road construction (Baker et al, Iowa Department of Transportation Highway Division and the Iowa Research Board, Final Report for TR-535, July 2005). However, no economically viable uses have been found, and hence, much of the lime softening residuals are currently hauled from the water plant and disposed of on land at considerable cost.

The processes described in the patents noted above, U.S. Pat. Nos. 2,018,449, 2,121,208, and 3,401,014 utilize a one-step reaction of lime with phosphoric acid under elevated temperatures and without the addition of water as a key ingredient. There is no prior art on the use of lime softening water plant residuals in the production of monocalcium phosphate and dicalcium phosphate as products. Also, the patents noted above do not teach a method to capture the carbon dioxide released in the reaction step. Carbon dioxide is a greenhouse gas implicated in global warming and climate change. Thus, it would be beneficial to capture this carbon dioxide for reuse in the water treatment operations or for sale.

SUMMARY OF THE INVENTION

The present invention proposes a two-step process for the production of monocalcium phosphate (MCP) from calcium sources including lime softening water plant residuals. In the first step of the two-step process, calcium carbonate in the lime softening sludge is reacted with phosphoric acid in the pH range 3 to 6 to produce dicalcium phosphate dihydrate (DCPD) and dicalcium phosphate anhydrous (DCPA) as the main products along with $CO_2$ that is released. DCP precipitates out as it has very low solubility in water. Depending on the conditions used the product may be entirely DCPD, entirely DCPA, or the product may contain both DCPD and DCPA. At the pH range of DCP precipitation many of the impurities in lime softening water plant sludge such as Mg, Fe, and other trace minerals are not precipitated. Thus, a pure DCP product can be obtained as a solid precipitate.

In the case of water plant sludge containing both lime softening sludge and coagulant sludge, the fast reaction will be between calcium carbonate in the lime softening sludge and phosphoric acid to form dicalcium phosphate. In the case of coagulant sludge containing aluminum hydroxide or ferric hydroxide as precipitate, the reaction with phosphoric acid will be slow due to the slow dissolution of hydroxide coagulant sludges. Thus, essentially pure dicalcium phosphate can be obtained whether one is dealing with lime softening sludge alone or a combination of lime softening sludge and coagulant sludge. The first step of the two-step process can also be used as a single step process to produce dicalcium phosphate from lime softening water plant residuals.

In the second step of the two-step process, the DCP generated from the first reaction step is reacted further with phosphoric acid in the pH range 1 to 2 to obtain monocalcium phosphate as the product. This reaction is controlled by surface reaction of phosphoric acid and by the rate of dissolution DCP. Mixing conditions, reaction time, and the amount of water used will be key factors in the formation of MCPM. One of the major advantages of the two-step process is the fact that pure monocalcium phosphate without the impurities present in the water plant sludge source material can be obtained.

The reaction between calcium carbonate and phosphoric acid in the first step of the two-step process involves the transport of phosphoric acid to the calcium carbonate surface, reaction with the calcium carbonate solid, and transport of the product DCP from the surface into the bulk liquid. As the solubility of DCPD or DCPA is quite low, precipitate formation may occur on the calcium carbonate surface. It is critical to control the calcium carbonate dispersion by using judicious amounts of water and good mixing conditions to provide good contact between the reactants for the complete conversion of calcium carbonate to DCP. This invention is not only aimed at producing the DCP and MCP by minimizing the water required for reaction in each step but also aimed at capturing the carbon dioxide generated in the process. It is well known that carbon dioxide is used in water softening in first stage and second stage re-carbonation processes. Accordingly, one of the goals of this invention is to capture the carbon dioxide released from the reaction of phosphoric acid with the carbonate present in water softening sludge for reuse. This also serves the purpose of reducing greenhouse gas emissions by capturing $CO_2$ emissions from dicalcium phosphate production.

This patent optimizes the amount of water and phosphoric acid that will be used in each step of reaction with the water plant residuals so as to minimize the amount of water that will need to be removed to produce a dry phosphate product. The reaction of phosphoric acid with calcium carbonate can be diffusion limited, or reaction limited. The reactant, phosphoric acid must diffuse to the surface of calcium carbonate for reaction to occur. The reaction product DCP must diffuse away from the surface of calcium carbonate particle surface for further reaction to occur. If the water present is insufficient, DCP may precipitate on the surface of calcium carbonate particles thereby slowing down further progress of the reaction. This can result in incomplete conversion of calcium carbonate to DCP. Mass transfer of the reactant and product are facilitated by the intensity and duration of mixing. Reaction rate can be enhanced by adding phosphoric acid incrementally to lime softening sludge slurry thereby conducting the reaction in the desired pH range. If phosphoric acid is pumped incrementally to the lime slurry solution in the reactor, the reaction will proceed at pH higher than 3 to produce DCP. In all cases, mixing will provide for the rapid transfer of the reactant to the calcium carbonate surface and transport of the product DCP away from the surface.

This patent describes the production of calcium phosphates using water plant residuals. However, one versed in the art can readily follow the procedures to react other calcium carbonate containing materials such as eggshells and seashells, and also other calcium containing compounds such as calcium chloride, calcium nitrate, and others to produce calcium phosphates for a variety of uses.

Lime softening residuals: Some drinking water supplies contain high amounts of calcium (Ca) and magnesium (Mg) salts, and if untreated, Ca and Mg can precipitate as calcium carbonate or magnesium hydroxide in water distribution systems, plumbing systems, hot water heaters and other fixtures causing a reduction in pipeline carrying capacity and damage to heating equipment.

Divalent cations in water, predominantly calcium and magnesium ions, cause hardness. Chemical softening using calcium hydroxide ($Ca(OH)_2$) also known as lime, and sodium carbonate ($Na_2CO_3$) or soda ash is commonly practiced by water treatment plants to remove hardness. The process used for softening depends on the Ca and Mg concentrations in the raw water supply and the nature of the hardness and alkalinity present in the water. Alkalinity is the acid neutralizing capacity of the water, and it is principally due to the presence of carbonate, bicarbonate, and hydroxide ions in the water. If the total alkalinity is greater than the total hardness, the hardness is present as carbonate hardness. In such cases lime alone can be used for softening the water. When the total alkalinity is less than total hardness, both carbonate and noncarbonate hardness are present in the water. Here both lime and soda ash must be used to produce water of desired hardness.

The reactions between calcium and magnesium salts with lime and soda ash will produce solid precipitates containing mainly calcium carbonate ($CaCO_3$) and magnesium hydroxide ($Mg(OH)_2$) in slurry form. These precipitates with any minor amounts of organic and inorganic particles in the water are collectively known as lime softening water plant residuals or lime softening water plant sludge. The terms lime softening residuals or lime softening sludge are also used to refer to lime softening water plant residuals. These terms may be interchangeably used in this text.

Residuals from lime softening plants will contain mainly Ca as CaCO3 and any unreacted $Ca(OH)_2$, and relatively smaller amounts of Mg as $Mg(OH)_2$. Lime softening residuals typically contain about 90% $CaCO_3$ (See J. van Leeuwen, D. J. White, R. J. Baker, and C. Jones, Land Contamination and Reclamation, 18 (4), 2011). The calcium to magnesium ratio in the sludge will vary depending on the source water quality and the type of softening practiced. Analyses from eight water plants in Ohio showed a Ca to Mg mole ratio that ranged from 7.2 to 1 to 12.9 to 1 (see Dastgheib et al, Energy & Fuels, 2018, 32, 6634-6640). If magnesium removal is not practiced, the sludge may not contain any magnesium hydroxide giving a calcium to magnesium ratio of 1 to 0.

Lime softening generically refers to both lime and lime-soda softening water treatment plants. Lime alone is used when only carbonate hardness is to be removed, and for noncarbonate hardness removal both lime and soda ash will need to be used. Lime in excess of stoichiometric quantity will be needed for Mg hardness removal. After precipitation of $Mg(OH)_2$ this excess lime is neutralized using $CO_2$. This will result in additional $CaCO_3$ precipitation. This patent is intended to embody all the different variations in lime-soda softening plant operations. This includes lime softening applications where inert particles are used as carrier materials for the deposition of lime softening precipitates. These are generically termed as pellet softening processes. The sludge quantities and composition will vary depending on the source water quality and the lime softening process conditions. The lime softening residuals may also contain iron and manganese compounds and other metals in trace quantities.

Turbidity in raw water supplies is from the presence of organic and inorganic particles. Aluminum or iron salts are commonly used to capture the turbidity by enmeshment in aluminum hydroxide ($Al(OH)_3$) or ferric hydroxide ($Fe(OH)_3$) precipitates. These precipitates along with the captured turbidity are commonly referred to as coagulant sludges. Sometimes polymers may also be needed for the effective removal of turbidity. Thus, some lime softening water plant sludges may also contain coagulant sludges and sludges associated with polymer addition. If coagulant sludge is combined with lime-soda softening, about 10% to 15% of the total sludge may be from the coagulation process. However, water treatment plants can segregate coagulant sludge by removing it in a separate sedimentation tank and conducting lime softening after this step.

Water plant sludges from lime softening may contain different amounts of water depending on whether dewatering processes are used to increase the solids concentration of the sludge. Different types of dewatering equipment such as centrifuges, belt filters, plate and frame filter processes or other equipment may be used to increase the solids content of the sludge. Solids concentrations will depend on the constituents in the lime softening residuals, the presence of coagulant sludges, and the type of dewatering equipment used. The concentrations of raw, thickened, and centrifuged sludge have been reported as 15.1%, 29%, and 67% respectively (see Zhou et al, Canadian Journal of Civil Engineering, (1992), Vol 19, pp 794-805). The process in the instant application can utilize the sludge as available from 1% to 100% solids concentration.

BRIEF DESCRIPTION OF THE DRAWINGS

A process flowsheet for a two-step process for the production of monocalcium phosphate from using lime or lime-soda ash water softening plant residuals is shown in the FIGURE. This is a general flowsheet that can accommodate the presence of both lime softening and coagulant sludges to obtain high purity monocalcium phosphates and dicalcium phosphates.

DETAILED DESCRIPTION OF THE PREFERRED EMBODIMENT

The FIGURE illustrates a two-step process for monocalcium phosphate production from water plant residuals and phosphoric acid. The solid line blocks represent necessary steps, and the broken line boxes are alternative steps that may be used to obtain a product with specific compositions with desired properties.

The process scheme for the first step in a typical two-step process involves the reaction of a slurry of water plant residuals from a storage tank 2 charged into an enclosed reactor 4 via transfer line 3 and mixed with phosphoric acid solution at a specified rate from the phosphoric acid solution tank 6 via transfer line 7. The lime softening residuals 1 obtained from the water plant may require the addition of water to obtain the desired slurry concentration. The reaction time, mixing, pH, temperature, and other parameters will be set to obtain optimum operating conditions and maximum conversion of softening residuals to dicalcium phosphate. The solids from reactor 4 will be transferred to a solids separation unit 5 wherein the solid DCP precipitate will be separated and transferred to the DCP reactor 15. Phosphoric acid solution will be added from solution tank 13 via line 14 to the reactor 15 wherein the reaction time, pH, mixing conditions and temperature will be controlled to produce monocalcium phosphate. The monocalcium phosphate in liquid form will be dried in unit 18 and granulated in unit 21. Anticaking agents and additional nutrients may be added from units 20 and 24 as desired to obtain products of specific compositions. If the MCP is to be utilized as a fertilizer, nitrogen and potassium agents may be added to obtain a balanced fertilizer. The filtrate from unit 5 can be in part recycled to reactor 4 to recover any DCP in solution. The remainder can be wasted.

Those skilled in the art will appreciate that a number of variations can be made in reacting the water softening sludge with phosphoric acid to produce monocalcium phosphate of different purities using a two-step process. It is intended that all such alterations are included within the scope of this invention.

According to the subject invention a two-step process is used to convert calcium carbonate in lime softening water plant residuals to monocalcium phosphate by reacting the sludge with phosphoric acid at ambient temperatures in the first step, and by reacting the dicalcium phosphate produced with phosphoric acid at ambient temperatures in the second step to obtain monocalcium phosphate.

In the first step, a slurry of lime softening sludge is contacted with incremental amounts of diluted phosphoric acid solution and mixed at high intensity for a period ranging from 1 to 24 hours depending on the experimental conditions. Higher mixing times will be required for lower phosphoric acid concentration in the reactor due to the amount of water added. A highly dispersed solution will provide better transport rate for the phosphoric acid to the calcium carbonate solid surface, and the transport of the solid dicalcium phosphate into the bulk solution. The temperature rise due to the heat of dissolution of phosphoric acid and the reaction between calcium carbonate and phosphoric acid is within 2° C. to 10° C. and depends on the rate of acid addition. The pH of the reaction needs to be maintained in the 3 to 6 range for DCP formation. The optimal final pH range for the solution is 5 to 6 or more preferably 5.4 to 5.6. Stoichiometric amount of phosphoric acid or a slight excess is used to effect complete conversion of the calcium carbonate in the sludge to dicalcium phosphate. If less than stoichiometric amount of phosphoric acid is used there will be unreacted calcite present in the final product. The precipitated dicalcium phosphate can be removed by standard solid-liquid separation processes such as filtration, centrifuging, or other methods and the filtrate containing impurities sent to waste or partly recycled to recover DCPD in solution.

The second step of the reaction involves the addition of stoichiometric amount of phosphoric acid to the solid dicalcium phosphate from the first step and conducting the reaction at a pH of 1 to 2. A more preferable pH range would be 1.4 to 1.8. This reaction is controlled by the dissolution rate of dicalcium phosphate for reaction with phosphoric acid. An excess amount of acid over the stoichiometric amount may be used to ensure complete conversion of DCP to MCP. Also, a partial conversion of say 70% to 90% of DCPD can be done to obtain a fertilizer that contains both slow release DCPD fertilizer and fast release MCP fertilizer. Monocalcium phosphate is also known as triple superphosphate fertilizer.

The amount of water added in this case can be minimized to reduce evaporation and drying costs involved in obtaining a dry solid product. A DCPD to water weight ratio of 1 to 16 can produce the desired MCP product, but a DCPD to water weight ratio of 1 to 4 and more preferably 1 to 2 can be used. The mixing time can range from 1 hour to 4 hours, but 1 hour to 2 hours is preferred.

In the following examples, studies were conducted using lime softening sludge obtained from the filter press unit at the water treatment plant located in the City of Topeka, Kansas. The sludge was dried and stored as dry powder for the experiments in the examples. Laboratory analysis of the data gave Ca, Mg, and K at 31.52%, 2.72%, and 0.07%, respectively. Other metals present included Fe, Cu, Mn, and Zn at values in ppm of 1,915, 2.1, 318.8, and 6.6, respectively. Also, $SO_4$—S and P were present at 0.16% and 0.061%, respectively. The effective calcium carbonate (ECC) was analyzed to be 90% and since the fineness factor was 99.3%, the calcium carbonate equivalent is 89.4%. The moisture content of the filter press lime sludge was about 32%.

In the first stage reaction experiments for producing dicalcium phosphate, the lime softening sludge was mixed with predetermined quantities of water in a 1 L closed reactor with a gas outlet and gas, pH, and temperature monitoring devices. Phosphoric acid at 85% concentration was premixed with selected amount of water and pumped at a given rate into the enclosed reactor containing predetermined amount of lime softening sludge slurry. All experiments in this study were conducted using 85% phosphoric acid. However other phosphoric acid aqueous solutions with different phosphoric acid weight percents can be used. The term phosphoric acid in this text will denote 85% phosphoric acid. The reaction was allowed to proceed for 1 to 24 hours, and the carbon dioxide evolution was monitored. At the end of mixing period, the sample was filtered to separate the precipitated dicalcium phosphate from the solution.

In the second step of the process the dicalcium phosphate from the first step was either dried or used without drying in the reaction between DCP with 85% phosphoric acid. In both cases, the precipitate is rinsed with water, ethanol, or other solvents to remove any solution containing dissolved constituents and phosphoric acid from the first step reaction. The reaction was conducted in the 1 L closed reactor as noted above. There is no evolution of gas in this reaction and hence an open reactor can also be used in this step. The reaction is conducted in the presence of water to provide for rapid dissolution of DCP for reaction with phosphoric acid. While the reaction can be conducted in the absence of additional water, water is added to more effectively control the pH and temperature of the reaction. The monocalcium phosphate obtained as a solution from the reaction is crystallized by heating or evaporated to dryness to obtain the MCP product. The reaction time was varied from 1 hour to 24 hours and the amount of water added was varied from 100 mL to 800 mL.

There are a number of variables that can be adjusted in each step of the process to operate the two-step process under optimal conditions. These include the amount of water to be added, phosphoric acid amount, pH, and mixing time and mixing conditions. The lime softening sludge from the water plant may be used as a slurry or after any solid-liquid separation process at the water plant. The sludge from Topeka, Kansas was filter pressed and contained about 32% moisture. The water addition required will be different for different sludges depending on the water content of the sludge. If no water is added in the first step, it will not be possible to obtain essentially pure dicalcium phosphate without impurities. This is a key advantage and novelty of this patent application. Also, this process allows the reactions to be completed under ambient temperature conditions and a low reaction time. All of the variables can be optimized to obtain substantially pure desired products for different end uses.

Example 1

Two-Step Process to Produce Monocalcium Phosphate from Lime Softening Sludge with Reduced Water and One Hour Reaction Time In the first step of this experiment 40 g of dry lime softening water plant sludge was dispersed in 100 mL of deionized (DI) water in a 1 L enclosed reactor and 24.2 mL of 85% phosphoric acid The dry weight of the precipitate was 59.9 g. This is close to the theoretical value calculated of 58.9 g for DCPD and DCPA assuming 100% conversion of the $CaCO_3$ in the sludge. ICP analyses gave the following data in percentage (%) for Ca, Mg, P, K, and $SO_4$—S as 25.09, 1.62, 19.92, 0.06, and 0.107 respectively. Additional analyses for metals gave the following data in ppm for Cu, Fe, Mn, and Zn as 3.2, 2148.4, 233.4, and 5.2 respectively. The data show that the dicalcium phosphate obtained is substantially pure and can be readily used for animal feed and fertilizer applications. Further, it is to be noted that any iron filings or particles that may be present in lime softening sludge can be removed by magnetic separation of iron from the softening sludge to reduce the amount of iron in the final product.

In the second step of the process, 50 g of dried solid sample from the first step was transferred to the reactor with 50 mL of DI water. A volume of 26.5 mL of phosphoric acid diluted with 50 mL of water was pumped into the reactor at the rate of 30 mL/min for one hour for the reaction to proceed. The initial pH of the solution was 5.6 and the final pH was 1.8. The rise in temperature of the solution was 2.1° C. At the end of one hour, the solution was transferred to a drying oven and dried at 100° C. A dry sample was analyzed by X-ray XRD to determine the mineralogical composition. The XRD analysis in percentage for each specie is as follows:

Monocalcium phosphate monohydrate 86.81
Monocalcium phosphate anhydrous 3.37
Dicalcium phosphate anhydrous 9.04
Dicalcium phosphate dihydrate 0.7

ICP analyses gave the following data in percentage (%) for Ca, Mg, P, K, and $SO_4$—S as 15.10, 1.08, 24.90, 0.00, and 0.07 respectively. Additional analyses for metals gave the following data in ppm for Cu, Fe, Mn, and Zn as 2.8, 1132.2, 157.6, and 4.2 respectively. Atomic absorption spectrophotometric analyses gave the following data in ppm for Cd, Pb, Ni, and Cr in ppm as 0.71, 0.56, 0.98, 0.26 respectively. These data indicate that the MCP product obtained is substantially pure and can be readily used in animal feed or fertilizer applications.

The dried precipitate weighed 72.4 g. This value is close to the theoretically calculated value of 73.2 g assuming 100% conversion of 50 g of DCPD to MCPM. The actual product obtained was a mix of MCP and DCP solids due to the incomplete conversion of DCP to MCP. This material can be used as a combination slow release (DCP) and fast release (MCP) fertilizer. However, the operating conditions can be modified to obtain the desired percentages of MCP and DCP in the final product. It is clear, the two step synthesis process has several operating variables that must be optimized to obtain the desired product composition.

Example 2

Two-Step Process to Produce Monocalcium Phosphate from Lime Softening Sludge with Two Hours Reaction Time In the first step of this experiment 40 g of dry lime softening sludge was dispersed in 200 mL of deionized (DI) water in a 1 L enclosed reactor and 24 mL of 85% phosphoric acid dissolved in 200 mL of DI water was pumped into the reactor at the rate of 30 mL/min. The initial pH of the solution was 8.6 and the final pH at the end of two hours of mixing was 5.4. The natural rise in temperature due to reaction was 2.4° C. The solution was mixed well at 800 rpm for two hours. At the end of two hours, the solution was filtered using a vacuum filter. A sample of 50 g of the solid precipitate that was not dried was transferred to the reactor and 200 mL of DI water as added to form a slurry. The solid precipitate is primarily composed of dicalcium phosphates. A volume of 27 mL of Phosphoric acid diluted with 200 mL of water was pumped into the reactor at the rate of 30 mL/min and the reaction was allowed to proceed for two hours. At the end of two hours, the solution was transferred to a drying oven and dried at 90° C. A dry sample was analyzed by X-ray diffraction (XRD) to determine the mineralogical composition. The XRD showed that the sample synthesized contained 100% monocalcium phosphate anhydrous (MCPA). The results showed that lime softening water plant residuals can be quantitatively converted to monocalcium phosphate which is also known as triple superphosphate fertilizer.

Example 3

Two-Step Process to Produce Monocalcium Phosphate from Lime Softening Sludge with Reduced Water Amount and Two Hours Reaction Time In the first step of this experiment 40 g of dry lime softening sludge was dispersed in 100 mL of deionized (DI) water in a 1 L enclosed reactor and 23 mL of 85% phosphoric acid dissolved in 100 mL of DI water was pumped into the reactor at the rate of 30 mL/min. The initial pH of the solution was 8.0 and the final pH at the end of two hours of mixing was 5.5. The natural rise in temperature due to reaction was 2.2° C. The solution was mixed well at 800 rpm for two hours. At the end of two hours, the solution was filtered using a vacuum filter. A sample of 50 g of the solid precipitate that was not dried was transferred to the reactor and 100 mL of DI water as added to form a slurry. The solid precipitate is primarily composed of dicalcium phosphates. A volume of 27 mL of Phosphoric acid diluted with 100 mL of water was pumped into the reactor at the rate of 30 mL/min and the second step reaction was allowed to proceed for two hours. At the end of two hours, the solution was transferred to a drying oven and dried at 90° C. A dry sample was analyzed by X-ray diffraction (XRD) to determine the mineralogical composition. The XRD showed that the synthesized sample contained the following, all expressed as percentages:

Monocalcium phosphate monohydrate 94.18
Monocalcium phosphate anhydrous 1.96
Dicalcium phosphate anhydrous 2.83
Dicalcium phosphate dihydrate 1.02

The results show that lime softening residuals can be converted completely to monocalcium and dicalcium phosphates. There is no calcite or other impurities such as Fe, Mg, in unacceptable amounts for field applications. The water plant residuals can be quantitatively converted to monocalcium phosphate which is also known as triple superphosphate fertilizer.

Example 4

Single-Step Process for Dicalcium Phosphate Production from Lime Softening Sludge with a Reaction Time of 24 Hours In this experiment 40 g of dry lime softening sludge was dispersed in 400 mL of deionized (DI) water in a 1 L enclosed reactor and 24 mL of 85% phosphoric acid dissolved in 400 mL of DI water was pumped into the reactor at the rate of 30 mL/min. The initial pH of the solution was 7.3 and the final pH at the end of 24 hours of mixing was 5.6. The natural rise in temperature due to reaction was 2.3° C. The solution was mixed well at 800 rpm for 24 hours. At the end of 24 hours, the solution was filtered using a vacuum filter. The precipitated DCP was dried at 110° C. to constant weight. The weight of the solid precipitate was 53 g. A dry sample was analyzed by X-ray diffraction (XRD) to determine the mineralogical composition. The XRD showed that the synthesized sample contained the following, all expressed as percentages:

Dicalcium phosphate dihydrate 98.7
Dicalcium phosphate anhydrous 1.00
Dipotassium hydrogen phosphate 0.31

The results show that lime softening residuals can be converted completely to dicalcium phosphates by reaction with phosphoric acid. The theoretically calculated product yield corresponding to 89.4% $CaCO_3$ in the sludge is 59.8 g based on 98.7% DCPD in the product. There is no calcite or other impurities in the product. The water plant residuals can be quantitatively converted to dicalcium phosphate which can be used as animal feed or as slow release fertilizer.

Example 5

Single-Step Process for Dicalcium Phosphate Production from Lime Softening Sludge with a Reaction Time of 12 Hours The experimental conditions used in this experiment was identical to that of Example 4 except for the fact that 12 hours reaction time was used. The initial pH of the sludge and phosphoric acid in 800 mL of water was 7.0 and the final pH after reaction was 5.8. After 12 hours of reaction the solution was filtered, and the precipitate was dried at 100° C. to dryness. The weight of the precipitate obtained was 61 g. XRD analysis gave the following data for each constituent in percentages:

Dicalcium phosphate dihydrate 97.7
Dicalcium phosphate anhydrous 0.51
Dipotassium hydrogen phosphate 1.80

These results show that lime softening sludges from water treatment plants can be converted quantitatively to dicalcium phosphates. The small amounts of $K_2HPO_4$ present is due to insufficient rinsing of the precipitate after filtration. The theoretically calculated value for dicalcium phosphates is 59.2 g, and this is close to the experimental value.

The data shown in Examples 1 to 5 indicate that lime softening residuals can be converted completely to monocalcium and dicalcium phosphates. There is no calcite or other impurities in the monocalcium and dicalcium phosphates obtained. Water plant residuals can be quantitatively converted to monocalcium phosphate which is also known as triple superphosphate fertilizer. It is also possible to obtain a mixture of monocalcium and dicalcium phosphates by adjusting the phosphoric acid dose. A properly proportioned mix of these phosphates can provide both quick release and slow release fertilizers for more effective use by plants and less phosphorus runoff into water bodies.

REFERENCES CITED

U.S. Patent Documents

U.S. Pat. No. 2,018,449 October 1935 Knox, Jr.
U.S. Pat. No. 2,121,208 June 1938 Milligan
U.S. Pat. No. 3,401,014 September 1968 Saeman Other Publications Baker, R. J., J. van Leeuwen, and D. J. White, Applications for reuse of lime sludge from water softening, Iowa Department of Transportation Highway Division and the Iowa Research Board, Final Report for TR-535, July 2005.

Dastgheib, S. A., H. H. Salih, J. Li, and C. Patterson, Utility lime sludge for flue gas desulfurization in coal-powered power plants: Part II. Lime sludge characterization and mercury re-emission, *Energy & Fuels,* 32, 2018, 6634-6640.

van Leeuwen, J., D. J. White, R. J. Baker, and C. Jones, Reuse of water treatment residuals from lime softening, Part I: Applications for the reuse of lime sludge from water softening, *Land Contamination & Reclamation,* 18, 2011, 393-415.

Zhou, H., D. W. Smith, and S. J. Stanley, Characterization and treatment of lime sludge dewatering effluents, *Canadian J. of Civil Engineering,* 19, 1992, 794-805.

I claim:

1. A two-step method to produce substantially pure monocalcium phosphates (MCPs) from lime softening water plant sludge with a first step comprising:
   (a) Providing lime softening water plant sludge with or without coagulant sludge;
   (b) Reacting the lime softening water plant sludge containing 1% to 100% solids by dry weight with a sufficient quantity of an aqueous solution of phosphoric acid under controlled reaction conditions including pH, mixing, duration of reaction, water to dry sludge ratio, phosphoric acid to dry sludge ratio, and method and order of reactants addition, to obtain a solid precipitate of dicalcium phosphate (DCP) in its anhydrous or hydrated form along with provisions to capture the carbon dioxide generated in the aforementioned reaction;
   (c) Recovering the precipitated DCP by solid-liquid separation and reacting the said DCP with phosphoric acid in a second step under controlled reaction conditions including pH, water amount, mixing, duration of reaction, water to dry DCP ratio, acid to dry DCP ratio, and method and order of reactants addition to obtain monocalcium phosphate as a solution or as a dry solid product by employing concentration and drying processes.

2. The method of claim 1 wherein the aforementioned reaction between lime softening water plant sludge and phosphoric acid is conducted in an enclosed reactor with a mixer, inlet ports for reactants, outlet ports for products, ports for monitoring pH, temperature, and gas flow, a gas outlet port for the withdrawal and collection of gases via the said gas outlet for the recovery of carbon dioxide generated in the reaction.

3. The method of claim 1 wherein the first step reaction between phosphoric acid and lime softening water plant sludge is conducted in the pH range 3 to 6, but completed in the DH range of 5.4 to 6.

4. The method of claim 1 wherein the first step reaction between phosphoric acid and lime softening water plant sludge is conducted with a water to dry sludge solids weight ratio of 2 to 1, to 20 to 1.

5. The method of claim 1 wherein the first step reaction between phosphoric acid and lime softening water plant sludge is conducted with a stoichiometric molar ratio of calcium carbonate in dry sludge to phosphoric acid of 1 to 1 to a slightly excess amount of phosphoric acid for reaction with other acid consuming constituents in the sludge.

6. The method of claim 1 wherein a reaction time duration of 1 hour to 24 hours is used.

7. The method of claim 1 wherein the first step reaction between phosphoric acid and lime softening water plant sludge is conducted by feeding phosphoric acid solution to a slurry of water plant residuals under mixing conditions so that rapid dispersion of the reaction products occurs.

8. The method of claim 1 wherein the precipitated dicalcium phosphate is separated using standard solid-liquid separation processes and used in the second reaction step, or separated, dried, and stored for use or sale.

9. The method of claim 1 wherein the dicalcium phosphate is purified for use as cattle feed supplement or as a slow-release fertilizer additive to quick release fertilizers.

10. The method of claim 1 wherein the carbon dioxide generated in the first step reaction between phosphoric acid and lime softening water plant sludge is collected, purified, and stored for reuse.

11. The method of claim 1 wherein the second step reaction between dicalcium phosphate and phosphoric acid is conducted in the pH range of 1 to 2.

12. The method of claim 1 wherein the second step reaction between dicalcium phosphate and phosphoric acid is conducted at the stoichiometric molar ratio of 1 to 1 or a slight excess of phosphoric acid to obtain complete conversion of dicalcium phosphate to monocalcium phosphate.

13. The method of claim 1 wherein a reaction time of 0.5 hour to 4 hours is used.

14. The method of claim 1 wherein the second step reaction between dicalcium phosphate and phosphoric acid is conducted with less than required stoichiometric amount of phosphoric acid to obtain a product containing both DCP and MCP for use as a combination slow-release and fast-release fertilizer.

15. The method of claim 1 wherein the second step reaction between dicalcium phosphate and phosphoric acid is conducted with dry weight of dicalcium phosphate to water weight ratio of 1 to 0, to 1 to 16.

16. The method of claim 1 wherein the solution of monocalcium phosphate obtained from the second reaction step is rinsed with ethanol or other suitable organic solvents to remove unreacted phosphoric acid and converted to a solid product by processes of spray drying, evaporative crystallization or other drying processes.

17. The method of claim 1 wherein the monocalcium phosphate product is supplemented with anticaking agents and compounds containing nutrients nitrogen, and potassium, individually or in combination to obtain a product more suitable as a complete fertilizer for agricultural applications.

* * * * *